United States Patent
Wei et al.

(10) Patent No.: US 9,596,045 B2
(45) Date of Patent: Mar. 14, 2017

(54) METHOD FOR DETERMINING IMPULSIVE INTERFERENCE APPLICABLE TO ORTHOGONAL FREQUENCY DIVISION MULTIPLE ACCESS SIGNAL RECEIVER AND RECEIVER THEREOF

(71) Applicant: MStar Semiconductor, Inc., Hsinchu Hsien (TW)

(72) Inventors: Fong-Shih Wei, New Taipei (TW); Ko-Yin Lai, Zhubei (TW); Chen-Yi Liu, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 107 days.

(21) Appl. No.: 14/562,827

(22) Filed: Dec. 8, 2014

(65) Prior Publication Data

US 2015/0163007 A1    Jun. 11, 2015

(30) Foreign Application Priority Data

Dec. 10, 2013    (TW) .............................. 102145353 A (51) Int. Cl.
*H04J 11/00*    (2006.01)
*H04L 25/03*    (2006.01)

(52) U.S. Cl.
CPC .... *H04J 11/0023* (2013.01); *H04L 25/03821* (2013.01); *H04L 2025/03414* (2013.01)

(58) Field of Classification Search
None
See application file for complete search history.

(56) References Cited

U.S. PATENT DOCUMENTS

| 8,116,395 B2 | 2/2012 | Sato | |
|---|---|---|---|
| 2005/0111561 A1* | 5/2005 | Sedarat | H04L 27/2614 375/260 |
| 2007/0030913 A1* | 2/2007 | Lin | H04L 1/0047 375/260 |
| 2009/0168929 A1* | 7/2009 | Liu | H03G 3/345 375/346 |
| 2009/0238289 A1* | 9/2009 | Sampath | H04L 5/0044 375/260 |
| 2010/0246726 A1* | 9/2010 | Asjadi | H04L 27/265 375/340 |

OTHER PUBLICATIONS

Taiwan Office Action, May 21, 2015, 6 pages.

* cited by examiner

*Primary Examiner* — Diane Lo
(74) *Attorney, Agent, or Firm* — Edell, Shapiro & Finnan, LLC (57) ABSTRACT

A method for determining impulsive interference applicable to an orthogonal frequency division multiple access (OFDMA) signal receiver is provided. The receiving method includes calculating a subcarrier noise of a first symbol, calculating a subcarrier noise of a second symbol, calculating a first ratio of the subcarrier noise of the first symbol to the subcarrier noise of the second symbol, determining whether the ratio is greater than a first threshold, and recognizing that the first symbol suffers from impulsive interference when the first ratio is greater than the first threshold.

18 Claims, 5 Drawing Sheets

METHOD FOR DETERMINING IMPULSIVE INTERFERENCE APPLICABLE TO ORTHOGONAL FREQUENCY DIVISION MULTIPLE ACCESS SIGNAL RECEIVER AND RECEIVER THEREOF

This application claims the benefit of Taiwan application Serial No. 102145353, filed Dec. 10, 2013, the subject matter of which is incorporated herein by reference.

BACKGROUND OF THE INVENTION

Field of the Invention

The invention relates in general to receiving signals, and more particularly, to receiving orthogonal frequency division multiple access (OFDMA) signals.

Description of the Related Art

The number of standards and specifications that transmit signals in form of orthogonal frequency division multiple access (OFDMA) is increasing, especially in the transmission of wireless signals, such as Digital Video Broadcasting-Terrestrial (DVB-T), DVB-T2, and Integrated Services Digital Broadcasting (ISDB). In the above signal transmission standards, due to the lack of time interleaving transmission specifications, these signal transmission standards are easily influenced by impulsive interference.

Figure 1:
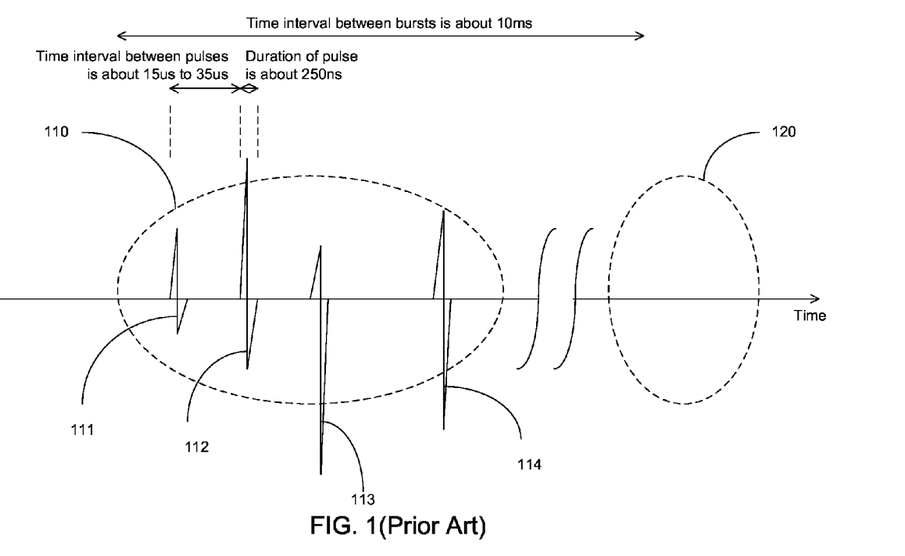
FIG. 1 is a schematic diagram of stereotypic impulsive interference.

FIG. 1 shows a schematic diagram of stereotypic impulsive interference. In FIG. 1, the time axis is not depicted in true ratios to emphasis a part to be explained by the present invention. As shown in FIG. 1, there are two bursts 110 and 120, spaced by a period of about 10 ms, along the time axis. The burst 110 includes four pulses 111 to 114, with an interval between the pulses being about 15 us to 35 us and each of the pulses lasting for about 250 ns. Further, the pulses have different strengths. Similarly, the burst 120 includes multiple pulses that are not shown.

FIG. 1 shows stereotypic impulsive interference. One person skilled in the art can understand that there are other types of impulsive interference. When encountering impulsive interference, frequency bands of all or at least a part of subcarriers of common OFDMA signals suffer from interference. As such, a receiver detects an increase in the signal strength for the interfered subcarrier frequency bands. The intensity of the impulsive interference is greater than the original additive white Gaussian noise (AWGN).

According to the DVB-T standard, the length of a symbol under a 2K mode is 224 us, and the length of a symbol under an 8K mode is 896 us. According to the DVB-T2 standard, the symbol length may be 112 us to 3584 us. In the stereotypic impulsive interference shown in FIG. 1, the time interval between two bursts is about 10 ms, which is far greater than the symbol length defined by the DVB-T and DVB-T2 standards. Further, the time interval between pulses is about 15 us and 35 us, which is noticeably shorter than the symbol length defined by the DVB-T and DVB-T2 standards. Further, the duration of each pulse is only about 250 ns. In other words, it is rare that two consecutive bursts suffer from the impulsive interference, and the burst may fall between a guard period between symbols or fall in a cyclic prefix.

Figure 2A:
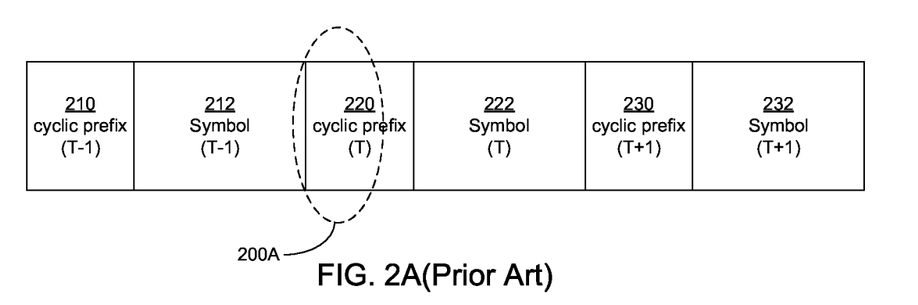
FIG. 2A is a schematic diagram of impulsive interference falling in a cyclic prefix.
Figure 2B:
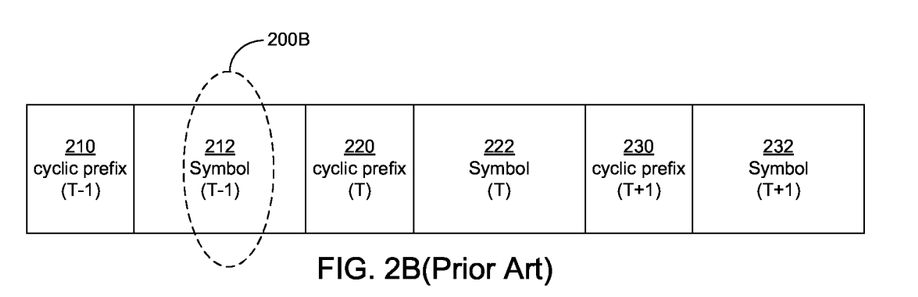
FIG. 2B is a schematic diagram of impulsive interference falling in a symbol.

FIG. 2A shows a schematic diagram of impulsive interference that falls in a cyclic prefix. In FIG. 2A, three OFDMA symbols 212, 222 and 232 respectively correspond to respective preceding cyclic prefixes 210, 220 and 230. A large part of a burst 220A falls in the cyclic prefix 220. Referring to FIG. 2B showing a schematic diagram of impulsive interference that falls in a cyclic prefix, another burst 220B falls in the symbol 212.

When encountering impulsive interference, the receiver needs to detect and recognize that the cyclic prefix of a particular symbol suffers from impulsive interference before being able to perform special processes on that symbol. Therefore, there is a need for a reliable mechanism for determining whether a symbol or a cyclic prefix of a symbol suffers from impulsive interference.

SUMMARY OF THE INVENTION

According to an embodiment of the present invention, a method for determining impulsive interference applicable to an orthogonal frequency division multiple access (OFDMA) signal receiver is provided. The receiving method includes calculating a subcarrier noise of a first symbol, calculating a subcarrier noise of a second symbol, calculating a first ratio of the subcarrier noise of the first symbol to the subcarrier noise of the second symbol, determining whether the ratio is greater than a first threshold, and recognizing that the first symbol suffers from the impulsive interference when the first ratio is greater than the first threshold.

According to another embodiment of the present invention, a receiver for OFDMA signals is provided. The receiver includes: a noise calculation module, configured to calculate a subcarrier noise of a first symbol and a subcarrier noise of a second symbol; a ratio calculation module, configured to calculate a ratio of the subcarrier noise of the first symbol to the subcarrier noise of the second symbol; a determination module, configured to determine whether the ratio is greater than a first threshold, and to recognize that the first symbol suffers from impulsive interference when the first ratio is greater than the first threshold.

A main spirit of the present invention is to determine whether the former symbol of two successive symbols suffers from impulsive interference according to a ratio of subcarrier noises of the former symbol and the latter symbol of the two successive symbols, so as to perform a process on the symbol that suffers from the impulsive interference.

The above and other aspects of the invention will become better understood with regard to the following detailed description of the preferred but non-limiting embodiments. The following description is made with reference to the accompanying drawings.

DETAILED DESCRIPTION OF THE INVENTION

Some embodiments are described in detail below. Apart from the disclosed embodiments, the present invention is also applicable in other embodiments. The scope of the present invention is not be limited by the description of the non-limiting embodiments, but is to be defined in accordance with the appended claims. To better describe and explain contents of the present invention to one person skilled in the art, different parts in the diagrams are not drawn according to relative sizes or ratios, and certain sizes and associated scales may be enlarged for better distinction. Further, irrelevant details may not be all depicted to maintain the simplicity of the diagrams for better understanding.

Figure 3:
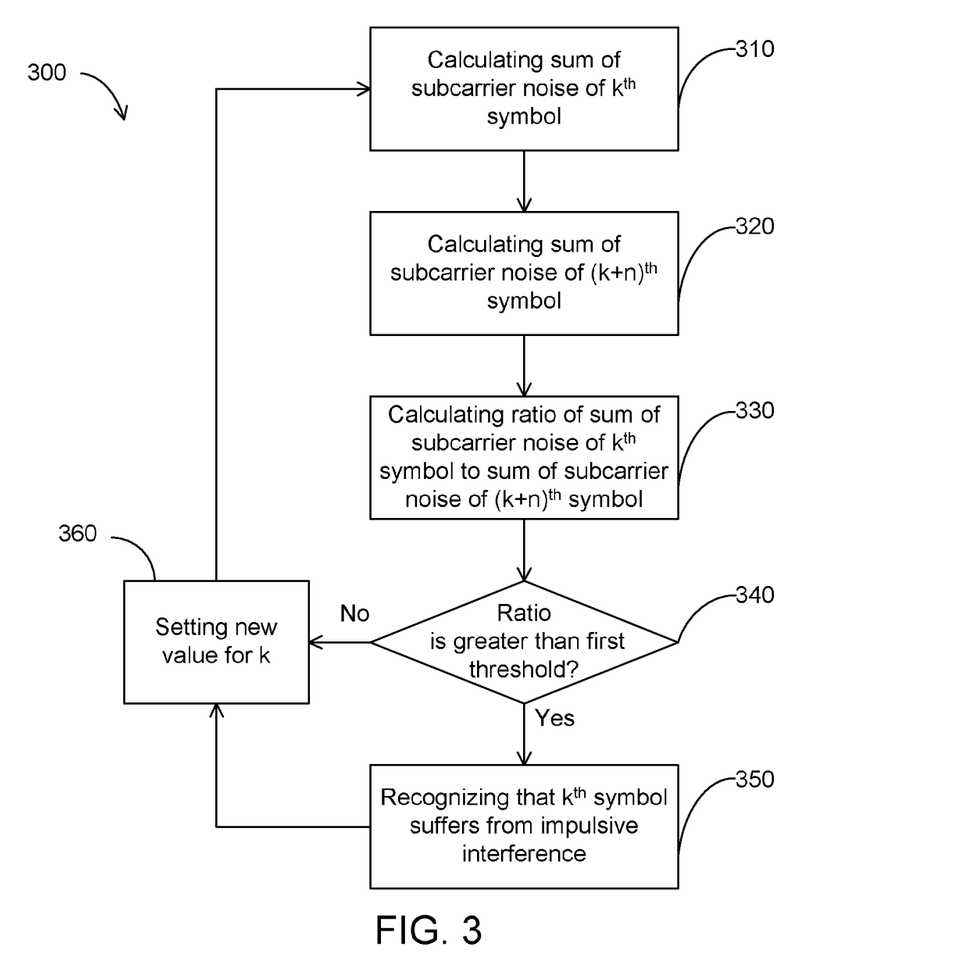
FIG. 3 is a flowchart of a process for determining impulsive interference according to an embodiment of the present invention.

FIG. 3 shows a flowchart of a process 300 for determining impulsive interference according to an embodiment of the present invention. Referring to 3, the process 300 includes following steps.

In step 310, a sum of noises of subcarriers of a $k^{th}$ symbol is calculated. These subcarriers may be all subcarriers of the symbol, and may include pilot subcarriers and data subcarriers. In another embodiment, these subcarriers may be all pilot subcarriers of the symbol. In another embodiment, these subcarriers may be a part of pilot subcarriers of the symbol. As a pilot signal is a signal known to a receiver, the receiver can more readily filter out noises of the pilot subcarriers. It should be noted that the purpose of the subcarriers is not limited by the present invention. When OFDMA signal transmission is conducted by utilizing one single subcarrier, a noise signal of this single subcarrier is the sum of noise signals.

In step 320, a sum of noises of subcarriers of a $(k+n)^{th}$ symbol is calculated, where n is a positive integer, i.e., a positive integer greater than or equal to 1. In step 320, the involved subcarriers are identical to those in step 310. For example, if the sum of noises of all subcarriers is calculated in step 310, the sum of noises of all subcarriers is also calculated in step 320. The value n may be adjusted based on actual applications. For example, the value n may be adjusted according to the model of impulsive interference and the length of symbols. In one embodiment of the present invention, an upper limit of the value n may be determined according to a time interval between bursts and the length of symbols. Further, assuming that the time interval between bursts in an impulsive interference model is 10 symbol lengths, the upper limit of n is supposedly 9 to prevent from encountering two bursts within in same calculation period. In addition, although the $(k+n)^{th}$ symbol is received after the $k^{th}$ symbol, the sequences for performing step 310 and step 320 are not limited by the present invention. This is because original sample data of the symbols may be stored in advance, and calculations of step 310 and step 320 can be performed later. One person skilled in the art can understand that, when n is set to 1, the situation in FIG. 2A may be encountered, i.e., the burst 200A falls in the cyclic prefix 220. In such a situation, a change in the noises of two successive symbols may not be greater than the first threshold. Therefore, in a preferred embodiment, the value n may be selected from a positive integer greater than 1.

In step 330 after steps 310 and 320, a ratio of the subcarrier noise of the $k^{th}$ symbol to the subcarrier noise of the $(k+n)^{th}$ symbol is calculated. That is, the calculation result of step 310 is divided by the calculation result of step 320.

In step 340, it is determined whether the ratio is greater than a first threshold. The process 300 proceeds to step 350 when the ratio is greater than the first threshold, or else the process 300 proceeds to step 360. In one embodiment, the ratio calculated in step 330 may be inverted. That is, the ratio of the subcarrier noise of the $(k+n)^{th}$ symbol to the subcarrier noise of the $k^{th}$ symbol may be calculated. An adaptive adjustment is made in step 340, e.g., it is determined whether the ratio is smaller than a second threshold. One person skilled in the art can understand that such modification is within the scope of the present invention.

In step 350, the receiver recognizes that the $k^{th}$ symbol suffers from impulsive interference. Thus, the receiver needs to perform a special process on the $k^{th}$ symbol. Step 360 is then performed.

In step 360, k is set to a new value. In one embodiment, the new k value may be the previous value added by one. In another embodiment, the new k value may be the previous value added by n to omit step 310 in the next round.

Figure 4:
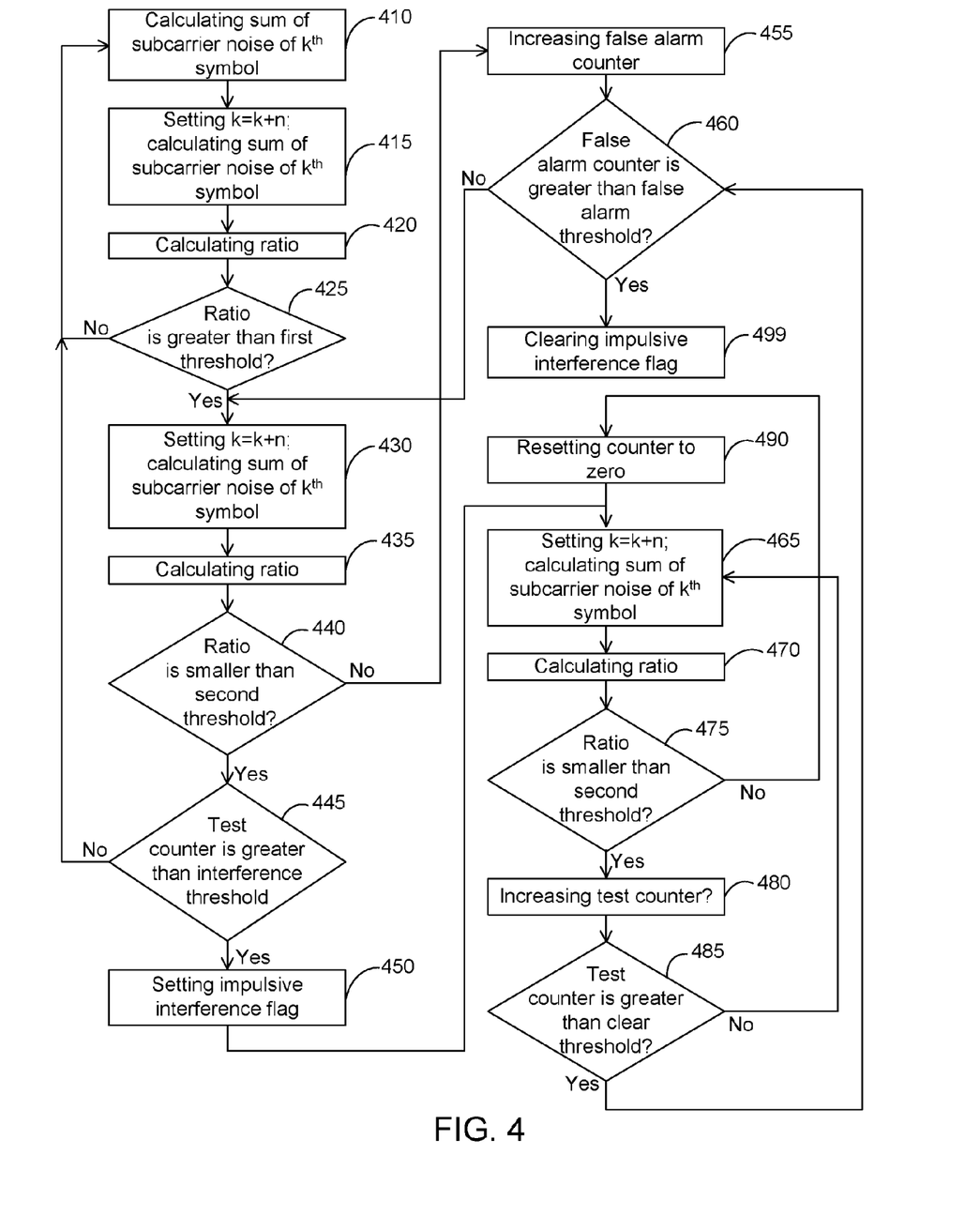
FIG. 4 is a flowchart of a process for determining impulsive interference according to an embodiment of the present invention.

FIG. 4 shows a flowchart of a process 400 for determining impulsive interference according to an embodiment of the present invention. In the embodiment, considering impulsive interference occurring between two symbols, a scenario of the ratio being smaller than the second threshold is added to the process 300 in FIG. 3. Further, the process 400 further involves counters and an impulsive interference flag value (IIS_Detected). The impulsive interference flag value is for indicating that a symbol suffers from impulsive interference. A false alarm counter (IIS_False_Alarm_Cnt) is a counter used when the ratio is greater than the first threshold but smaller than the second threshold to prevent misjudgment resulted from using only the first threshold. A test counter (IIS_Test_Cnt), serving a purpose similar to that of the false alarm counter, is for preventing a predetermined number of subsequent symbols from being misjudged as suffering from impulsive interference after a symbol is recognized as suffering from impulsive interference. A threshold of the test counter is referred to as a clear threshold (IIS_Disappear_Cnt). The false alarm threshold and the clear threshold may be the same or different. Referring to FIG. 4, the process 400 includes following steps.

In step 410, a sum of noises of subcarriers of a $k^{th}$ symbol is calculated. Details of this step may be referred from step 310 in FIG. 3.

In step 415, k is set to k+n, and the sum of noises of subcarriers of the $k^{th}$ symbol is again calculated. In other words, the sum of noises of subcarriers of the $(k+n)^{th}$ symbol is calculated. Details of this step may be referred from step 320 in FIG. 3.

In step 420, a ratio between the sums of the subcarrier noise obtained in step 410 and 415 is calculated. Details of this step may be referred from step 330 in FIG. 3. This ratio is a ratio of the sum of the subcarrier noise of the $k^{th}$ symbol to the sum of the subcarrier noise of the $(k+n)^{th}$ symbol.

In step 425, it is determined whether the ratio obtained in step 420 is greater than a first threshold. The process 400 proceeds to step 430 when the ratio is greater than the first threshold, or else proceeds to step 410. Details of this step may be referred form step 340 in FIG. 3. In one embodiment, when the ratio is not greater than the first threshold, k may be set to a new k+n value, and step 410 is iterated.

In step 430, k is set to k+n, and the sum of noises of subcarriers of the $k^{th}$ symbol is again calculated. In other words, the sum of noises of subcarriers of the $(k+2n)^{th}$ symbol is calculated.

In step 435, a ratio between the sums of the subcarrier noise obtained in step 415 and 430 is calculated. This ratio is a ratio of the sum of the subcarrier noise of the $(k+n)^{th}$ symbol to the sum of the subcarrier noise of the $(k+2n)^{th}$ symbol.

In step 440, it is determined whether the ratio obtained in step 435 is smaller than a second threshold. As previously stated, impulsive interference does not successively affect adjacent symbols. Therefore, when step 425 determines that the ratio of the sum of subcarrier noise of the $k^{th}$ K symbol to the sum of the subcarrier noise of the $(k+n)^{th}$ symbol is greater than the first threshold, and step 440 determines that the ratio of the sum of the subcarrier noise of the $(k+n)^{th}$ symbol to the sum of the subcarrier noise of the $(k+2n)^{th}$ symbol is smaller than the second threshold, it is almost certain that the $k^{th}$ symbol suffers from impulsive interference. When it is determined that the ratio of the sum of the subcarrier noise of the $(k+n)^{th}$ symbol to the sum of the subcarrier noise of the $(k+2n)^{th}$ symbol is greater than the second threshold, it means that the determination basis may be incorrect, and so the process 400 proceeds to step 455.

In step 445, it is determined whether a value of the test counter is greater than an interference threshold. The process 400 proceeds to step 450 when the test counter is greater than the interference threshold. The test counter is for determining a minimum number of symbols between a previous occurrence of impulsive interference and a next occurrence of impulsive interference. For example, assuming that the two occurrences of impulsive interference are spaced by 5n numbers of symbols, the interference threshold may be set to 5.

In step 450, the impulsive interference flag is set. Further, it is indicated that the $k^{th}$ symbol suffers from impulsive interference, and so it is necessary that other processing circuits or software perform a special process on the $k^{th}$ symbol. After setting the impulsive interference flag, it is similarly checked whether the ratio between the sums of subcarrier noise of a pair of subsequent symbols is smaller than the second threshold, and so the process 400 proceeds to step 465. Before entering step 465, details of a process when a false alarm occurs in step 440 are first given below.

In step 455, a value of the false alarm counter is increased.

In step 460, it is determined whether the value of the false alarm counter is greater than a false alarm threshold. When the false alarm counter is greater than the false alarm threshold, the process 40 returns to step 430 to calculate the sum of noises of subcarriers of a next symbol (e.g., the $(k+3n)^{th}$ symbol). Step 435 is then performed to calculate a pair of symbols (e.g., the ratio between the $(k+2n)^{th}$ symbol and the $(k+3n)^{th}$ symbol) and step 440 is performed for a next round of determination. The process 400 proceeds to step 499 when it is determined in step 460 that the value of the false alarm counter is greater than the false alarm threshold.

In step 465, k is again set to k+n, and the sum of noises of subcarriers of the $k^{th}$ symbol is again calculated.

In step 470, the ratio of the sum of subcarrier noise of the symbol previously calculated to the sum of subcarrier noise of the symbol calculated in step 465 is calculated.

In step 475, it is determined whether the ratio obtained in step 470 is smaller than the second threshold. When the ratio is smaller than the second threshold, it means that the ratio of a pair of symbols after setting the impulsive interference has restored to a normal value. Thus, the process 400 proceeds to step 480, or else the process 400 proceeds to step 490.

In step 480, the value of the test counter is increased.

In step 485, it is determined whether the value of the test counter is greater than a clear threshold. When the value of the test counter is greater than the clear threshold, it means that the ratio of certain pairs of symbols after setting the impulsive interference flag has restored to normal, and so the process 400 proceeds to step 499; or else, the process 400 returns to step 465.

In step 490, the test counter is reset to zero.

In step 499, the impulsive interference flag is cleared. Regardless of whether the impulsive interference flag is previously set, the impulsive interference flag is altogether cleared in this step.

Figure 5:
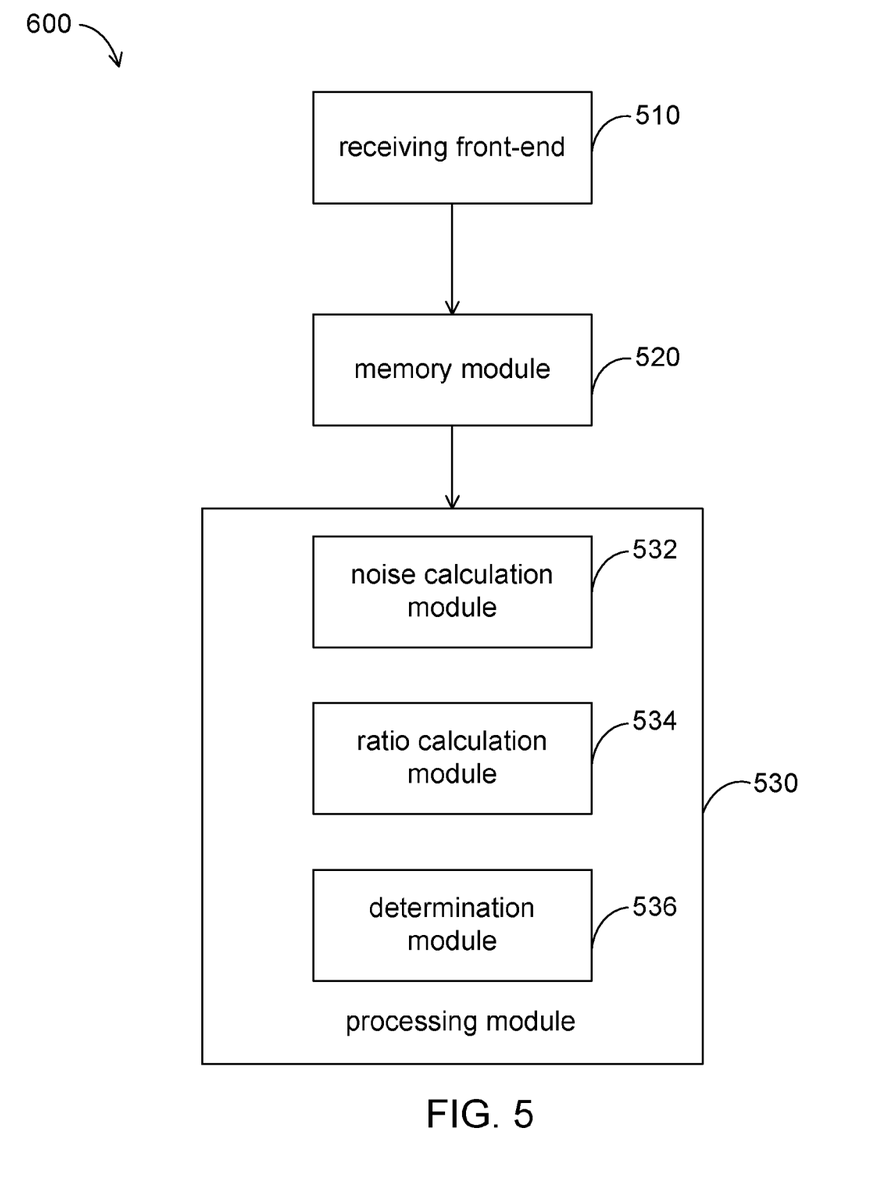
FIG. 5 is a block diagram of a receiver according to an embodiment of the present invention.

FIG. 5 shows a block diagram of a receiver 500 according to an embodiment of the present invention. The receiver 500, being adapted to receive signals transmitted in form of OFDMA, includes a receiving front-end 510, a memory module 520 and a processing module. The receiving front-end 510 may include circuits such as an antenna, an analog-to-digital converter (ADC), a sampler, a fast Fourier transform (FFT) converter, and is for analyzing individual symbols to be stored in the memory module 520.

The processing module 530 includes a noise calculation module 532, a ratio calculation module 534 and a determination module 536. The processing module 530 may be utilized to perform the processes 300 and 400 in FIG. 3 and FIG. 4. In one embodiment, the noise calculation module 532 is utilized to perform steps 310 and 320 of the process 300, the ratio calculation module 534 is utilized to perform step 330 of the process 300, and the determination module 536 is utilized to perform steps 340 to 360 of the process 300.

In another embodiment, the noise calculation module 532 is utilized to perform steps 410, 420, 430 and 465 of the process 400, the ratio calculation module 534 is utilized to perform steps 420, 435 and 470 of the process 400, the determination module 536 is utilized to perform the remaining steps of the process 400, and the memory module 520 is utilized to further record the counters and thresholds required in the process 400.

One person skilled in the art can understand that, the processing module 530 may be implemented by software, hardware, or software collaborating with hardware. The implementation of the processing module 530 is not limited by the present invention.

In conclusion, a main spirit of the present invention is to determine whether the former symbol of two successive symbols suffers from impulsive interference according to a ratio of subcarrier noises of the former symbol and the latter symbol of the two successive symbols, so as to perform a process on the symbol that suffers from the impulsive interference.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining impulsive interference applicable to an orthogonal frequency division multiple access (OFDMA) signal receiver, comprising:
   calculating a subcarrier noise of a first symbol;
   calculating a subcarrier noise of a second symbol;
   calculating a first ratio of the subcarrier noise of the first symbol to the subcarrier noise of the second symbol;
   determining whether the first ratio is greater than a predetermined first threshold; and
   recognizing that the first symbol suffers from the impulsive interference when the first ratio is greater than the first threshold,
   wherein the second symbol is an $n^{th}$ symbol subsequent to the first symbol, where n is a positive integer greater than or equal to 1, and n is determined according to a time interval between bursts and a length of symbols.

2. The method according to claim 1, wherein a subcarrier corresponding to the subcarrier noise carries at least one of a pilot signal and a data signal.

3. The method according to claim 1, wherein the subcarrier noise of the first symbol is a sum of noises of one of all subcarriers, one single subcarrier and a part of all subcarriers.

4. The method according to claim 1, wherein the impulsive interference comprises a plurality of bursts, and a time interval between the bursts is greater than a time interval between the first symbol and the second symbol.

5. The method according to claim 1, wherein when the first ratio is greater than the first threshold, the method further comprising:
calculating a subcarrier noise of a third symbol, wherein the third symbol is a symbol subsequent to the second symbol;
calculating a second ratio of the subcarrier noise of the second symbol to the subcarrier noise of the third symbol;
determining whether the second ratio is smaller than a predetermined second threshold; and
recognizing that the first symbol suffers from impulsive interference when the first ratio is greater than the first threshold and the second ratio is smaller than the second threshold.

6. The method according to claim 5, wherein when the first ratio is greater than the first threshold and the second ratio is smaller than the second threshold, the method further comprising:
determining whether a test counter is greater than an interference threshold; and
setting an impulsive interference flag when the test counter is greater than the interference threshold, and recognizing that the first symbol suffers from impulsive interference.

7. The method according to claim 6, after setting the impulsive interference flag, further comprising:
calculating a subcarrier noise of a fourth symbol, wherein the fourth symbol is a symbol subsequent to the third symbol;
calculating a third ratio of the subcarrier noise of the third symbol to the subcarrier noise of the fourth symbol;
determining whether the third ratio is smaller than the second threshold;
increasing the test counter when the third ratio is smaller than the second threshold;
determining whether the test counter is greater than a clear threshold; and
clearing the impulsive interference flag when the test counter is greater than the clear threshold.

8. The method according to claim 7, further comprising:
resetting the test counter to zero when the third ratio is greater than the second threshold; and
calculating a subcarrier noise of a fifth symbol, wherein the fifth symbol is a symbol subsequent to the fourth symbol.

9. The method according to claim 6, wherein when the second ratio is greater than the second threshold, the receiving method further comprising:
increasing a false alarm count;
determining whether the false alarm counter is greater than a false alarm threshold; and
clearing the impulsive interference flag when the false alarm counter is greater than the false alarm threshold.

10. The method according to claim 5, wherein the second threshold is a reciprocal of the first threshold.

11. An OFDMA signal receiver, comprising:
a noise calculation module, configured to calculate a subcarrier noise of a first symbol and a subcarrier noise of a second symbol;
a ratio calculation module, configured to calculate a first ratio of the subcarrier of the first symbol to the subcarrier noise of the second symbol; and
a determination module, configured to determine whether the first ratio is greater than a first threshold,
wherein the first symbol is recognized to suffer from impulsive interference if the ratio is greater than the first threshold,
wherein the second symbol is an $n^{th}$ symbol subsequent to the first symbol, where n is a positive integer greater than or equal to 1, and n is determined according to a time interval between bursts and a length of symbols.

12. The receiver according to claim 11, wherein a subcarrier corresponding to the subcarrier noise carries at least one of a pilot signal and a data signal.

13. The receiver according to claim 11, wherein the subcarrier noise of the first symbol is a sum of noises of one of all subcarriers, one single subcarrier and a part of all subcarriers.

14. The receiver according to claim 11, wherein the impulsive interference comprises a plurality of bursts, and a time interval between the bursts is greater than a time interval between the first symbol and the second symbol.

15. The receiver according to claim 11, wherein when the first ratio is greater than the first threshold, the noise calculation module further calculates a subcarrier noise of a third symbol, wherein the third symbol is a symbol subsequent to the second symbol; the ratio calculation module further calculates a second ratio of the subcarrier noise of the second symbol to the subcarrier noise of the third symbol; the determination module further determines whether the second ratio is smaller than a second threshold, and recognizes that the first symbol suffers from impulsive interference when the first ratio is greater than the first threshold and the second ratio is smaller than the second threshold.

16. The receiver according to claim 15, wherein when the first ratio is greater than the first threshold and the second ratio is smaller than the second threshold, the determination module further determines whether a test counter is greater than an interference threshold, sets an impulsive interference flag when the test counter is greater than the interference threshold, and recognizes that the first symbol suffers from impulsive interference.

17. The receiver according to claim 16, wherein after setting the impulsive interference flag, the noise calculation module further calculates a subcarrier noise of a fourth symbol, wherein the fourth symbol is subsequent to the third symbol; the ratio calculation module further calculates a third ratio of the subcarrier noise of the third symbol to the subcarrier noise of the fourth symbol; the determination module further determines whether the third ratio is smaller than the second threshold, increases the test counter when the third ratio is smaller than the second threshold, determines whether the test counter is greater than a clear threshold, and clears the impulsive interference flag when the test counter is greater than the clear threshold.

18. The receiver according to claim 17, wherein the determination module further resets the test counter to zero when the third ratio is greater than the second threshold; the noise calculation module further calculates a subcarrier noise of a fifth symbol, wherein the fifth symbol is a symbol subsequent to the fourth symbol.

* * * * *